United States Patent [19]
Raybeck et al.

[11] 3,884,084
[45] May 20, 1975

[54] METHOD FOR DETERMINATION OF OIL COATING WEIGHTS ON NON-OIL ABSORBING SURFACES

[75] Inventors: Ralph M. Raybeck; Charles R. Hines, both of Pittsburgh, Pa.

[73] Assignee: Jones & Laughlin Steel Corporation, Pittsburgh, Pa.

[22] Filed: June 20, 1974

[21] Appl. No.: 481,097

[52] U.S. Cl. .................. 73/432 R; 73/64; 73/150 R
[51] Int. Cl. ........................................... G01n 33/28
[58] Field of Search ................ 73/64, 150 R, 432 R; 23/230 HC, 253 TP

[56] References Cited
UNITED STATES PATENTS

| | | | |
|---|---|---|---|
| 1,792,606 | 2/1931 | Richards et al. | 73/150 R X |
| 1,895,154 | 1/1933 | Fischer, Jr. | 73/64 X |
| 2,456,342 | 12/1948 | Trevor | 73/432 R |
| 2,890,797 | 6/1959 | Matthews | 23/253 TP X |
| 3,128,780 | 4/1964 | Worrell | 73/150 R X |

*Primary Examiner*—Charles A. Ruehl
*Attorney, Agent, or Firm*—Gerald K. White; T. A. Zalenski

[57] ABSTRACT

Oil coating weights on non-oil absorbing material surfaces are determined by placing a permeable material covered cylinder end in contact with an oil coated metal surface, adding an oil solvent to the interior of the cylinder so as to dissolve the oil contained on the surface, and permitting the solvent to evaporate so as to leave a substantially circular translucent oil stain on the permeable material. Physical characteristics of the oil stain which correlate with oil coating weight are then measured and compared with known standards in order to determine the oil coating weight contained on the surface.

11 Claims, 2 Drawing Figures

METHOD FOR DETERMINATION OF OIL COATING WEIGHTS ON NON-OIL ABSORBING SURFACES

The development of a rapid, simple, and accurate testing procedure for determining oil coating weights applied to non-oil absorbing material surfaces is an extremely desirable and important objective, particularly in the metals industry. The testing procedure of the invention, however, may be used to determine oil coating weights on any smooth oil coated material which will not absorb oil or an oil solvent. Oil coated ferrous and non-ferrous metals, glass, as well as metal or glass coated substances may be tested by the method. The above stated objective if of particular importance in the production of cold rolled steel strip and sheet as well as in tin plate production. Oil coating weight is a variable which has direct influence upon product performance. For example, low oil coating weights may lead to excessive steel rusting and the occurrence of friction scratching during uncoiling. On the other hand, high oil coating weights lead to surface tension related sticking problems of thin sheets during automatic feeding operations and slippage during magnetic or suction transfer of steel sheets. It is axiomatic that the use of a rapid, simple testing procedure for oil coating weight determination would be invaluable from the standpoints of oil coating related problem solving as well as in the in-process control of the oil coating application processes.

Coating weight determinations of oils on non-oil absorbing material surfaces, such as steel, have been extremely difficult to obtain with a high degree of analytical accuracy. Commonly used methods include vapor extraction and ellipsometer measurement. Techniques employing vapor degreasing followed by weighing of the solvent-free residue or involving the weighing of the steel before and after degreasing lack both accuracy and reproducibility. U.S. Pat. No. 3,128,780 discloses a somewhat similar technique for determining the amount of metallic coating applied to a substrate. Such deficiencies are believed to be related to the extraction of iron oxide and other substances from the steel surface along with the oil coating. The ellipsometer technique is considered to be accurate on extremely thin oil films commonly used for tinplate coating. Such films are generally on the order of 1 gram/base box. A base box is defined as 64,274 square inches of steel. Grams of oil per base box, of course, is defined as that weight of oil contained on a 64,274 square inch area of steel surface. However, the accuracy of the ellipsometer technique is not high at coating weight levels in excess of 1 gram/base box.

Micro combustion techniques have also been applied to surface carbon analysis in relation to oils and other organic contaminants. A discussion of this technique is contained in *Anal. Chem.*, Vol. 42, No. 1, 1970 at pages 103–106.

Although, within the limitations described, the above methods may be considered to be generally somewhat accurate and reliable, all such procedures are relatively sophisticated laboratory techniques which require expensive and time-consuming laboratory analysis. On the other hand, the method of the invention is a rapid, uncomplicated test developed for the in situ estimation of thin oil coating weights on metal surfaces. The method generally comprises placing a permeable cellulosic type material covered end of a hollow cylinder in contact with an oil coated metal surface and then adding a suitable oil solvent into the hollow cylinder so that the solvent will pass through the permeable material covered end of the cylinder and dissolve the oil coating. Upon evaporation of the solvent a substantially circular, visible translucent oil stain will remain on the permeable material. By measuring certain physical characteristics, such as the width of the stain, and then comparing the measurements with previously established standards developed from known coating oil weights, one can readily determine the oil weight of the tested surface. Once having established a standard for oil ring thickness versus oil weight on a particular surface, such standard is usable for the particular type or grade of oil regardless of type of surface. For example, if a standardization is developed with use of a steel surface, the standard may also be used for aluminum, glass, tin plate, etc. surfaces. Thus, it may be seen that this simple, non-destructive testing technique enables one to readily determine coating oil weights in an expedient manner without resort to elaborate and costly laboratory techniques.

It is thus an object of our invention to provide a simple, reliable procedure for the in situ determination of coating oil weights on metal surfaces.

It is a further object of our invention to provide a coating oil weight determination procedure that is non-destructive and is suitable for use at plant locations rather than a test which must be performed in the laboratory.

These and other objectives and advantages will occur to those skilled in the art from the following description of the invention.

Figure 1:
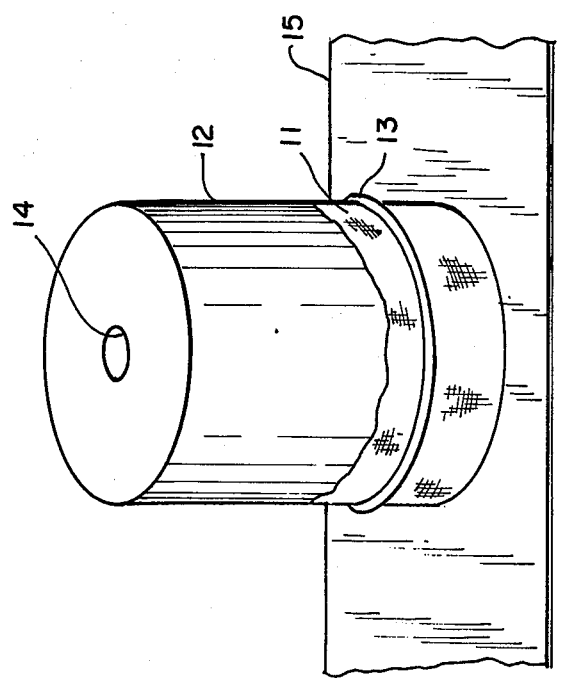
FIG. 1 is a representation of testing apparatus suitable for use in the method of the invention.

Testing apparatus which has been found to be suitable for the practice of the invention is depicted in FIG. 1. The apparatus is constructed by centering a piece of permeable material 11 over the open end of hollow cylinder 12 and then conforming the permeable material evenly and tightly over the cylinder end. Cylinder 12 may be constructed of metal or plastic material. Then, securing member 13 is forced down over the edges of permeable material 11 in order to secure the permeable material to the completely open end of cylinder 12. Securing member 13 may be an O-ring, rubber band, or the like. It may be further convenient to provide a groove on the outer surface of cylinder 12 so as to improve the degree of securing action of securing member 13. Cylinder 12 also contains opening 14 at its other end which is adapted for the introduction of a solvent which will pass through hollow cylinder 12 and permeable material 11 and then serve to dissolve or strip coating oil on the surface of metal strip 15.

By the nature of the testing procedure and stripping mechanism, the metal surface area to be tested should be flat, dry, and in a relatively horizontal position for optimum formation of the oil ring.

During testing, the permeable substance covered end of cylinder 12 is placed onto the surface of metal strip 15 and tightly held in place until oil stripping has been accomplished. An appropriate amount of solvent is added through opening 14 so as to strip coating oil from the surface of metal strip 15. The solvent is permitted to evaporate while cylinder 12 remains in position. Drying may be facilitated by frequent blowing across opening 14. Permeable material 11 is then removed from cylinder 12 and flattened in preparation for measurement of the formed oil ring. At this point, dye which will color the surface of the permeable material, but not the oil stain, may be applied and permitted to air dry. This procedure is of value in improving the visibility of the oil stain for purposes of subsequently measuring physical characteristics of the stain. However, dying is considered to be only a preferred process step in the sense that the testing procedure is fully operative without inclusion of the dying step. Hematoxylin dye is suitable for use in the invention. When dry, the permeable material will be dyed red. In the event that there is moisture present on the permeable material, the Hematoxylin dye will turn blue-colored.

The oil weight on the metal surface may be determined from the oil ring by various techniques that relate to ring width measurements. Such measurements may conveniently be made with an eyepiece reticle and then compared with historically developed data. Visual comparison with actual life-size photographic oil rings or mechanically drawn line thicknesses for known oil weights is also a suitable technique. It is important, notwithstanding the measurement technique employed, that the standard be developed for the same type of oil as is tested in order to obtain a meaningful correlation because ring width varies with oil type.

Various types of cellulosic materials such as paper are suitable for use as the permeable material. In particular, cigarette paper appears to be the most suitable for the test because of its permeability and ability to form oil rings of good definition. The cellulosic material should be of a generally similar thickness as cigarette paper because the material must conform to the cylinder shape without the formation of an inordinate amount of pleats. Excessive pleating of the material tends to remove oil from such area through capillary action with resultant detriment to the formation of a uniform ring contour. Thus very thin paper thicknesses are preferred. However, it should be understood that any material having good permeability for oil and solvent transfer and being capable of providing for good oil ring definition may be used in the practice of the invention. It should also be understood that the same paper used in the prior standardization procedure should also be used for the testing of an unknown sample.

Benzene has been found to be an effective stripping reagent for the removal of coating oils, such as animal tallow or vegetable oil, from metal surfaces. However, any solvent which will serve to remove a given oil and not affect the surface of the oil carrying substrate is satisfactory for purposes of the invention. The quantity of solvent to be used is dependent upon the surface area to be stripped and thus would be readily ascertainable by those skilled in the art. Generally, 40 to 50 micro liters of benzene are sufficient to strip animal or vegetable oil from a test area embraced by a 1 inch diameter cylinder.

Evolution of the oil ring from the oil-solvent solution is believed to be a result of several physical processes. Liquid chromatographic migration under a solvent atmosphere, capillary action through the permeable material fibers, and surface tension phenomena are all believed to influence the quantitative migration of the oil-solvent solution to the circumference area of the test cylinder. Rapid evaporation of the solvent deposits oil in the form of a ring in an essentially uniform manner.

Figure 2:
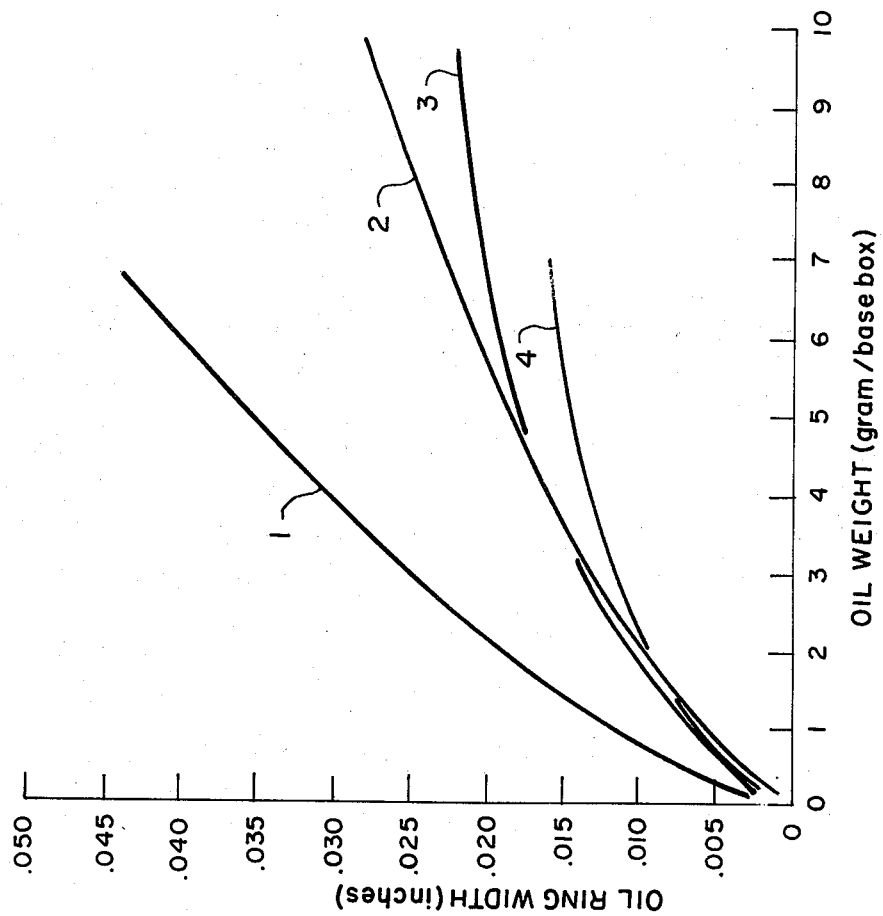
FIG. 2 is a graph which illustrates relationships between oil stain width and oil coating weight for three commercially employed coating oils.

The width of the oil ring is a function of the viscosity of the oil. Light oils, such as cottonseed, dioctyl sebacate, and motor oil have a high diffusion rate into the permeable material which leads to a relatively wide stain per unit oil weight. Heavier oils, such as animal fat derivatives, have a low diffusion rate and therefore form relatively narrow stains. This factor is illustrated in FIG. 2 in which a plot of oil ring widths versus oil weight is shown. Curve 1 was developed for steel strip coated with a light oil (S.U.V. 100°F = 110 seconds). Curves 2 and 4 were developed from tests conducted for two heavier animal fat oils (S.U.V. 100°F = 230 seconds). Curves 1, 2, and 4 represent the cumulative results of four consecutive strippings. By consecutive strippings it is meant that the testing procedure is repeated at least once at a different area of the test surface with use of the same permeable material. Curve 3 illustrates that the light oil has approximately twice the mobility in terms of oil ring width than the two heavier animal fat oils. Hence, one necessarily must compare ring width measurements of a given oil with standards of the same oil in order to obtain a reproducible and accurate oil weight value. Moreover, curves 1 and 3 also serve to illustrate that test sensitivity increases with the number of multiple strippings. Because oil ring width is cumulative and additive when multiple strippings are conducted, several advantages are obtained. First of all, very low oil weights may be detected and read through the accumulation of oil from a known number of tests. Secondly, heavier oil weights may be relatively easily measured with the use of fewer strippings than in the case of light oils. This means that the test may be flexibly designed for use with a specific weight of oil. Thirdly, the oil ring is additive and therefore one has the advantage of being able to obtain an average oil weight over a relatively large surface area. Because of uneven metal controur or inconsistencies in oil coating apparatus, oil films are oftentimes not evenly distributed across metal surfaces. A determination of average coating weight through use of a number of tests employing the same permeable material is of significant advantage in such instances.

As discussed above, the number of multiple strippings required to obtain a reasonably readable oil stain width per oil weight is basically a function of oil type. Too many multiple strippings are cumbersome and too few strippings tend to decrease test sensitivity. Hence, the choice of number of multiple strippings is dependent upon oil type and a tradeoff of sensitivity and time considerations.

Typical sensitivity limits for three commonly used coating oils are shown by the following Table. It should be noted that the sensitivity limits are based upon a given number of strippings, and therefore, would be broadened or narrowed in the event that a greater or lesser number of strippings were to be employed. The lower limit represents the minimum oil weight that will produce a discernable oil stain for the indicated number of strippings and the upper limit indicates the oil weight beyond which differences in ring widths are not visually distinguishable.

TABLE

Sensitivity Limits of the Oil Ring Test

| Curve No. of Oil Shown on Figure 2 | S.U.V. at 100°F | Number Test Strippings | Milligrams Oil Per Square Inch of Area | |
|---|---|---|---|---|
| | | | Lower | Upper |
| 3 | 110 seconds | 2 | 0.008 | 0.090 |
| 4 | 230 seconds | 4 | 0.008 | 0.075 |
| 2 | 230 seconds | 4 | 0.008 | 0.135 |

While direct measurement of oil stain characteristics such as width are clearly suitable for use in correlating test measurements with physical characteristics of oil coated metal surfaces of known oil weight, it is preferred to use a set of permanent standards which may be directly visually compared with the test results in order to achieve the necessary comparison or correlation. Such procedure further reduces total testing time to on the order of several minutes. Photographic reproductions of standard oil rings are suitable for such purposes. The oil weight standards are developed by preparing a series of oil stains for various types of coating oils of different known oil weights. The known weights, of course, must be determined through use of such techniques as micro combustion, ellipsometer measurement and vapor extraction.

We claim:

1. A method for determining the weight of oil coatings on a non-oil absorbing material surface, comprising:
   a. placing a permeable material covered end of a substantially circular hollow container in contact with an oil coated surface which is composed of a non-oil absorbing material;
   b. adding an oil solvent into the interior of said hollow container in a manner which causes said solvent to pass through said permeable material and to dissolve oil contained on said oil coated surface;
   c. permitting said solvent to evaporate so as to leave a substantially circular oil stain on said permeable material;
   d. measuring physical characteristics of said oil stain which correlate with oil coating weight of said oil coated surface; and
   e. determining the weight of oil contained on said oil coated surface by comparing the measured oil stain physical characteristics with oil stain physical characteristics of oil coated surfaces of a known oil weight.

2. A method for determining the weight of oil coatings on a non-oil absorbing material surface according to claim 1, wherein:
   said oil coated surface is a metal surface.

3. A method for determining the weight of oil coatings on a non-oil absorbing material surface according to claim 2, wherein:
   said metal comprises a ferrous metal.

4. A method for determining the weight of oil coatings on a non-oil absorbing material surface according to claim 3, wherein:
   said metal comprises tinplate.

5. A method for determining the weight of oil coatings on a non-oil absorbing material surface according to claim 1, wherein:
   said permeable material comprises a cellulosic material.

6. A method for determining the weight of oil coatings on a non-oil absorbing material surface according to claim 5, wherein:
   said permeable material comprises paper.

7. A method for determining the weight of oil coatings on a non-oil absorbing material surface according to claim 1, wherein:
   said oil coating is a member selected from the group consisting of animal fat oil and vegetable oil.

8. A method for determining the weight of oil coatings on a non-oil absorbing material surface according to claim 1, wherein:
   said solvent is benzene.

9. A method for determining the weight of oil coatings on a non-oil absorbing material surface according to claim 1, which further includes:
   applying a dye over the surface of the permeable material after the solvent has evaporated and permitting said dye to dry so as to dye portions of the permeable material that do not contain said oil stain whereby visibility of said oil stain is enhanced.

10. A method for determining the weight of oil coatings on a non-oil absorbing material surface according to claim 1, wherein:
    the step of measuring physical characteristics of the oil stain comprises measuring the width of said oil stain.

11. A method for determining the weight of oil coatings on a non-oil absorbing material surface according to claim 1, which further includes: repeating steps a, b, and c at a different location on said oil coated metal surface at least one time prior to performing steps d and e.

* * * * *